June 14, 1927.
C. A. CAMPBELL
1,632,757
TRIPLE VALVE
Filed Feb. 5, 1927 2 Sheets-Sheet 2
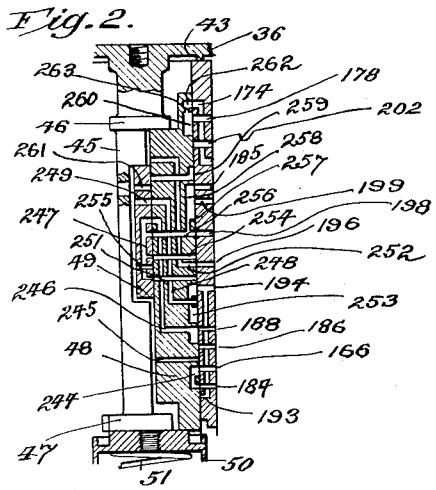
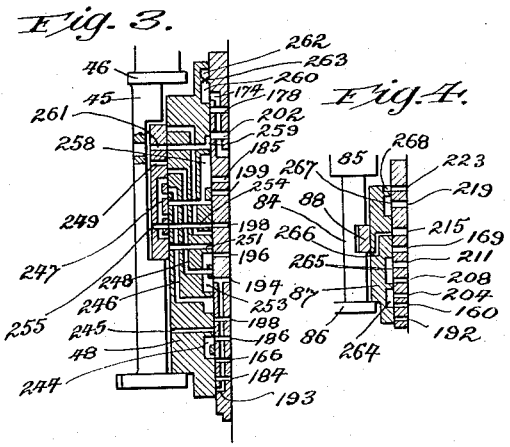
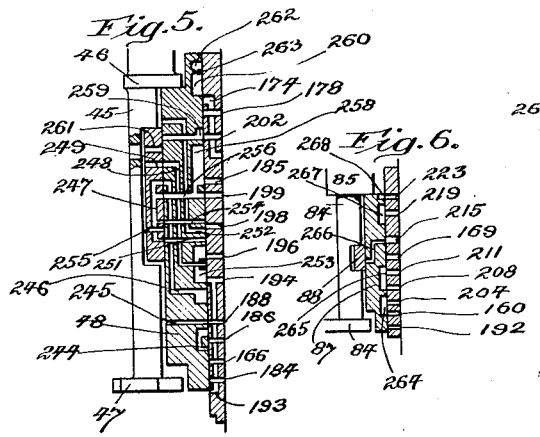
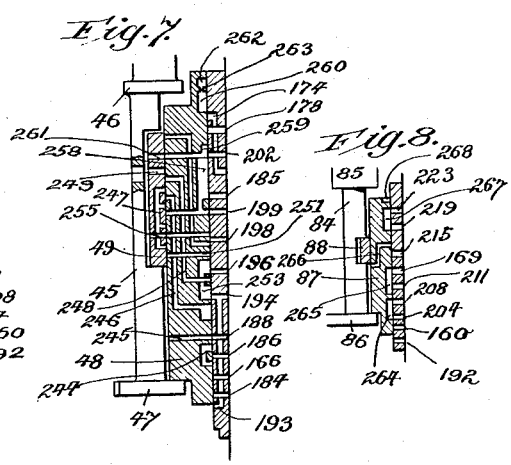
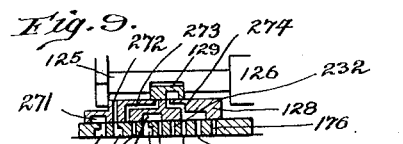
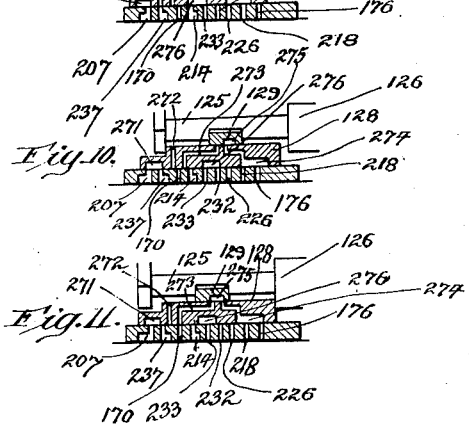
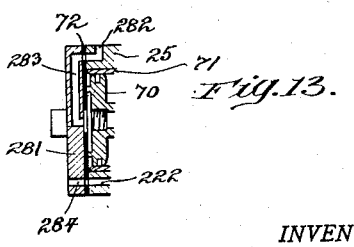
INVENTOR
Charles A. Campbell
BY
Oodyear Jones.
ATTORNEYS Patented June 14, 1927.

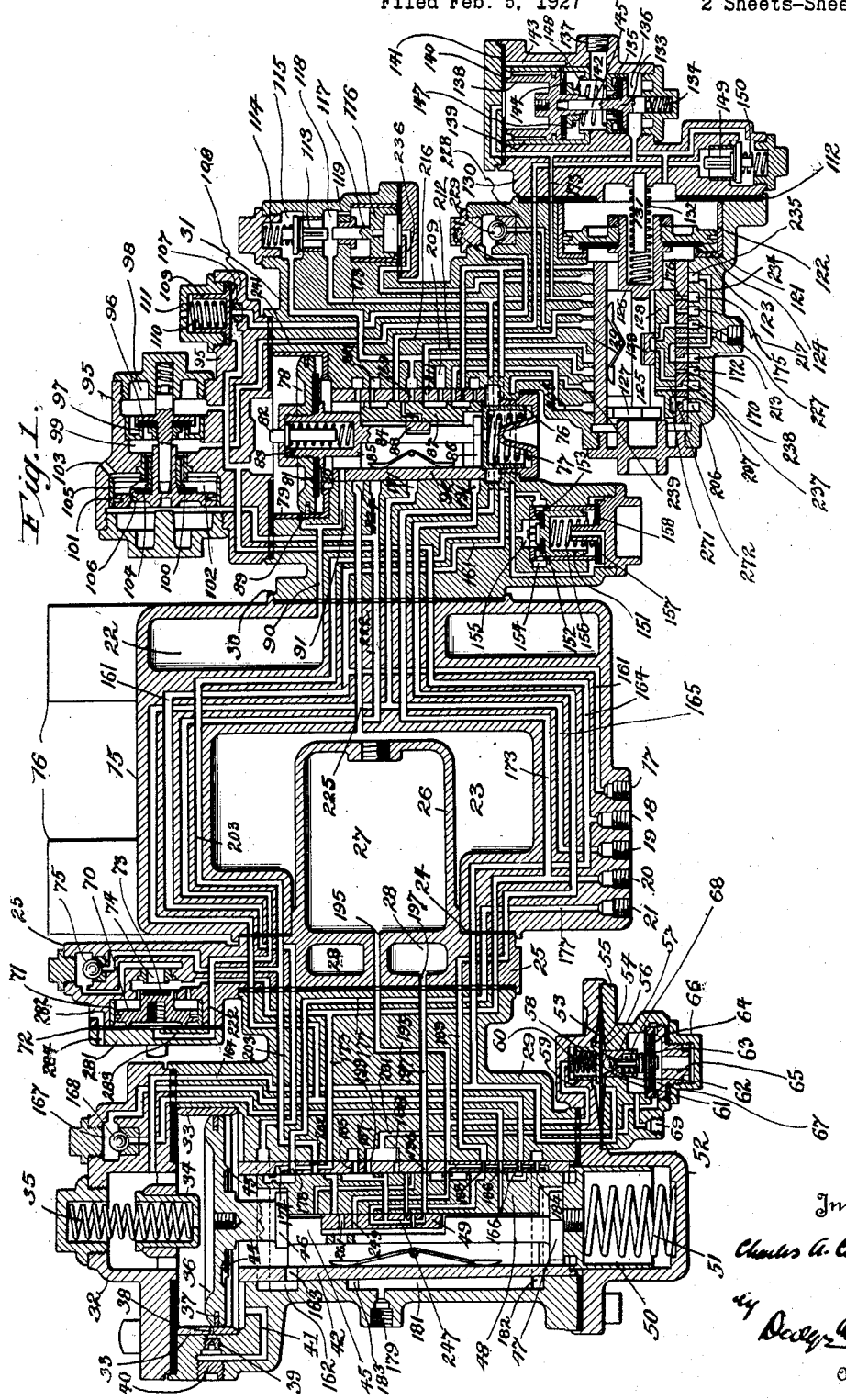

1,632,757

UNITED STATES PATENT OFFICE.

CHARLES A. CAMPBELL, OF WATERTOWN, NEW YORK, ASSIGNOR TO THE NEW YORK AIR BRAKE COMPANY, A CORPORATION OF NEW JERSEY.

TRIPLE VALVE.

Application filed February 5, 1927. Serial No. 166,202.

This invention relates to triple valves and particularly to triple valves for use on long trains such as freight trains.

It is well known that the K-2 triple, which embodies characteristics known in the art as quick serial action in service, restricted recharge and restricted release, does not adequately meet the requirements of service where extremely long trains are encountered as at present. On such trains the restricted recharge does not entirely prevent overcharge of auxiliary reservoirs at the forward end of the train, and such overcharge of course results in re-application when the engineer moves his brake valve from full release to running position. This tendency to re-application is affected unfavorably by the action of the quick service vent, the effect of the vent being to intensify the re-application and increase the number of cars upon which it occurs.

The present invention relates to certain improvements upon a type of triple valve described in the application of Minnier and Campbell, Serial No. 27,472, filed May 2, 1925, and Campbell No. 112,109, filed May 27, 1926.

In order that the principles underlying the operation of the improved triple valve may be readily understood and in order that the relation of the present application to the prior applications aforesaid may be made clear, an outline in general terms of the more important characteristic functions of the present valve will now be given.

The main mechanism of the valve includes as usual a triple valve, a graduating valve movable relatively thereto, and a triple piston with graduating stem, the piston controlling the charge to the auxiliary reservoir and also actuating the slide valve and its graduating valve. There are also auxiliary valve mechanisms controlled by corresponding pistons which perform the emergency application functions and the local venting of the brake pipe in service, as well as a number of other special functions which can be understood better after a general statement of the operative characteristics.

The valve mechanism as a whole is characterized by restricted recharge which is brought about in the usual manner, namely, by having the triple piston overtravel against spring resistance and throttle the feeding flow from the brake pipe to the auxiliary reservoir. The effects of restricted recharge are, as usual, to increase the speed of propagation of the releasing pressure wave throughout the length of the brake pipe and to reduce the tendency to overcharge at the forward end of the train.

Restricted recharge is accompanied by restricted release. This, as usual, is brought about through the overtravel of the slide valve in such a manner as to choke the exhaust port and thus retard the out-flow of air from the brake cylinder. The effect is to delay the release of brakes on the forward cars until the brakes on the rear cars shall have released.

The valve mechanism includes a quick serial service mechanism which conforms in its underlying principle to that described and claimed in the prior applications. The service vent is of the equalizing discharge type as in the prior applications, but is actuated by a diaphragm instead of a piston as heretofore, and the diaphragm itself serves as the valve. The equalizing diaphragm forming the quick service valve is subject to brake pipe pressure acting in an opening direction and to pressure admitted from an equalizing chamber in a closing direction. The equalizing chamber is charged during release from the auxiliary reservoir. When the triple valve starts toward service position it puts the equalizing chamber which is already in communication with the space above the equalizing diaphragm into communication with a fixed volume known as the reduction chamber. Under normal conditions the reduction chamber is at atmospheric pressure and the relation of its volume to the volume of the equalizing chamber is such that the pressures in the two chambers equalize at a chosen pressure, for example about 7 pounds below the normal equalizing chamber pressure (i. e., normal brake pipe pressure). Consequently the quick service vent opens and then automatically closes when a 7 pound reduction of brake pipe pressure has been made.

The use of a diaphragm as a combined abutment and valve, instead of a piston and separate valve, has marked effect on the functioning of the equalizing discharge valve, as well as upon compactness and lightness of the structure. The amount of air to be discharged is relatively so small that the use of a small diaphragm is practicable. This fact and the elimination of leakage and friction permits the use of very small equalizing and reduction chambers, so small that the displacement of the diaphragm as it moves is an appreciable proportion of the total volume of the two chambers. It follows that the diaphragm movements appreciably affect the equalized pressure in the two chambers, and a gradual rather than a sudden closing of the vent is had. This eliminates the surging of brake pipe pressures, sometimes observed where a piston actuated vent valve is used.

As has been stated, the reduction chamber is at atmospheric pressure under normal conditions, that is, after normal release. The triple valve is so contrived that during retarded release the reduction chamber is cut off from the atmosphere and is slowly charged to auxiliary reservoir pressure. Consequently the drop in pressure in the equalizing chamber, when it is connected to the reduction chamber immediately after retarded release, will vary inversely with the duration of retarded release. Thus the equalizing quick service valve will open for a short time or may not open at all in an application quickly following retarded release. This function is useful because in case of reapplication occasioned by over-charged auxiliary reservoirs the quick service valves will not open and increase the reapplication tendency.

When the triple valve moves to normal release position after retarded release, the reduction chamber is slowly bled down to atmospheric pressure so that by the time the over-charge of the reservoir has been dissipated, the reduction chamber will be at atmospheric pressure and the quick service valve will be ready to accelerate service applications by opening until a 7 pound reduction of brake pipe pressure has occurred.

The outlet from the quick service valve is independently controlled by the quick service check valve. During service venting this is held open by pressure acting against a diaphragm. An unduly severe brake pipe reduction moves the triple valve far enough to vent the pressure acting on said diaphragm, whereupon the quick service check closes and terminates the flow through the quick service valve. This action is local to every triple valve, and prevents the service valves from causing undesired emergency applications.

The emergency mechanism is such that the operation of the emergency controlling valve is not under the control of the triple slide valve. Instead, the emergency controlling valve responds exclusively by the rate of reduction of brake pipe pressure. The emergency controlling valve is actuated by a piston which is subject to brake pipe pressure on one side and to pressure in the chamber called the emergency control chamber on the other side. There is also a closely related emergency actuating chamber which in emergency applications furnishes pressure to actuate the emergency actuation piston and related mechanisms. During service reduction the emergency control chamber and the emergency actuation chamber are conjointly vented at a restricted rate into the brake cylinder and the rate of venting corresponds to the proper rate of brake pipe reduction for service applications. So long as brake pipe pressure is reduced at the proper service rate, the emergency controlling valve assumes a neutral position, in which it is ready to produce an emergency application if the brake pipe pressure be reduced faster than the normal service rate.

The present invention includes certain details concerned with charging the emergency control chamber and emergency actuation chamber around the emergency control piston and involves the use of a retard stop for this piston.

Means are provided which function in service applications when the auxiliary reservoir pressure has been reduced to within a stated differential, say 5 pounds from brake cylinder pressure, to by-pass the air flowing from the emergency control chamber and the emergency application chamber, and deliver it to the brake pipe instead of to the brake cylinder. The size of the port through which the flow is by-passed is so proportioned that the back flow from these two chambers passes to the brake pipe at a service rate without any movement of the emergency control valve. If this rate be exceeded for any cause, an emergency application will be produced. The effect of this construction is to conserve the operating fluid by discharging it into the brake cylinder so far as possible.

Emergency applications occur, in the mechanism of the present application, in three stages. In the first stage brake pipe air passes to the brake cylinder until a brake cylinder pressure of 15 pounds (more or less) is reached. During the flow of brake pipe air to the brake cylinder the flow of auxiliary reservoir air to the brake cylinder is throttled or entirely stopped by a cut out valve. A bleed port determines how long the flow of auxiliary reservoir air shall remain throttled or cut off, but a period of seven seconds is ordinarily appropriate. In the second stage of emergency applications, air from the auxiliary reservoir flows freely to the brake cylinder.

An emergency reservoir distinct from the auxiliary reservoir is used and this not only furnishes air for the third emergency stage, but is availed of to secure several highly desirable secondary results. When the pressure in the brake cylinder has risen to within, say 5 pounds of auxiliary reservoir pressure (the exact time of action is determined by design), a so-called change-over piston shifts and admits air from the emergency reservoir to the brake cylinder.

The general effect of this type of emergency actuation in which pressure is admitted from three different sources in three different steps is to build up emergency pressures gradually and allow the slack to bunch. Nevertheless, the emergency application is propagated throughout the length of the train with the utmost rapidity and the brakes are applied with full pressure even when the emergency application follows a full service application, because the air in the emergency reservoir is retained in service applications, and its pressure equalizes only with the brake cylinder volume.

The purpose of limiting the admission of brake pipe air to the brake cylinder to 15 pounds is to ensure the admission of only sufficient air to the cylinder to bunch the slack without undue shock. Complete equalization of the brake pipe with brake cylinder would give a brake cylinder pressure of about 32 pounds per square inch, and this is high enough to cause an injuriously severe run-in of slack. By admitting air up to 15 pounds brake cylinder pressure and then venting the remaining brake pipe air to atmosphere smooth braking and rapid brake pipe venting are both secured.

In the emergency function brake pipe air is fed to the brake cylinder only while brake cylinder pressure is below 15 pounds and above that brake cylinder pressure, brake pipe air is vented directly to the atmosphere. Consequently, if a service application has produced a pressure of 15 pounds in the brake cylinder, and brake pipe pressure is thereafter suddenly reduced to bring about an emergency application, the brake pipe will be initially vented to the atmosphere and the emergency pressure-drop will be rapidly propagated throughout the brake pipe.

A prime advantage of the emergency reservoir is that the pressure fluid in this reservoir is never drawn on in service applications. Consequently, it is always available for emergency. This available store of air is further safeguarded by the fact that it is not admitted to the brake cylinder until after the flow of auxiliary reservoir air is virtually completed. In this way the brake cylinder is brought to the highest pressure possible by means of brake pipe air and auxiliary reservoir air. The emergency reservoir is then allowed to equalize with the brake cylinder volume only, flow of pressure fluid from the emergency reservoir and brake cylinder to the auxiliary reservoir being prevented by a check valve. This is an important point as it allows the use of an emergency reservoir of much smaller volume and yet ensures a high emergency cylinder pressure.

The emergency reservoir is charged from the auxiliary reservoir through the main slide valve in normal release position and not in retarded release position. Consequently direct over-charging of the emergency reservoir is not possible in restricted recharge position. Nevertheless if the auxiliary reservoir became overcharged, it would overcharge the emergency reservoir when the triple valve moved back to normal release and recharge position. To counteract this possibility the valve is so contrived that when the triple slide valve moves to restricted recharge position, it bleeds the emergency reservoir to atmosphere through a port of such size that pressure in the emergency reservoir will be reduced by a small amount, ordinarily about 10 pounds.

In case of restricted recharge and release the auxiliary reservoir may and probably will be overcharged, but at the same time the emergency reservoir will be bled down to sub-normal pressure. When the triple valve moves back to normal release position, the pressure in the emergency and auxiliary reservoirs equalizes through the emergency reservoir feed port in the slide valve, restoring the emergency reservoir charge and at the same time relieving some or all of the overcharge in the auxiliary reservoir. This minimizes the tendency for re-application to occur when the engineer moves his valve to running position.

The arrangement just described has another beneficial effect. Suppose an emergency application be made immediately after release. Immediately after release the auxiliary reservoirs on cars at the front of the train are likely to be overcharged or at any rate charged more heavily than those at the rear of the train. Conversely, the emergency reservoirs at the front end of the train will have been bled down more or less and the effect is to produce approximately the same final emergency pressure in the brake cylinders throughout the entire length of the train.

The construction is such that the emergency reservoir equalizes rapidly with the brake cylinder in emergency applications. It is possible to get various braking pressures by the use of emergency reservoirs of different sizes.

Except for the small amount of air discharged from the emergency reservoirs during restricted release, and this as a rule occurs only on a few cars of the train, the device is quite economical of air. For example during service application graduations the air from the emergency actuation chamber and from the emergency control chamber is fed to the brake cylinder and this action continues almost until equalization occurs between brake cylinder and auxiliary reservoir.

The emergency controlling valve is so arranged that it must move quickly to the release position if the triple valve moves to release and recharge position. The ports are so contrived in this present valve that when the triple slide valve is in release and recharge position and the vent valve is in emergency position, the air in the emergency control chamber is vented to atmosphere. As soon as this occurs, brake pipe pressure, acting on the emergency control piston, heavily predominates and restores the emergency control piston.

Except for the substitution of diaphragms for pistons, and the changed charcter of the equalizing reduction chambers, the mechanism just described is essentially similar to that described and claimed in my application 112,109, above identified. The main features of novelty in the present application are the special form and arrangement of the quick service venting valve, the use of an automatic emergency valve peculiarly suited for a triple valve of this general type, and the use of a retard stop with the emergency control piston.

The function of the automatic emergency valve is to produce an emergency application if the brake pipe pressure drops below some chosen value even when the pressure falls slowly. The separation of the service and emergency mechanisms and the characteristic of the emergency control valve which causes it to respond only to sudden reductions of brake pipe pressure, renders such a mechanism desirable. An important novel feature of this automatic emergency mechanism is that, unlike prior valves for this purpose, there is no danger of loss of brake pipe pressure when this pressure is being increased at a slow rate.

Generally stated, the function of the device is as follows: A slow reduction of brake pipe pressure moves the triple valve portion and the emergency valve portion to service position, and in this position the emergency control valve bleeds the emergency control chamber and the emergency actuating chamber. A loaded valve is provided which functions to terminate this bleeding action when, and only when, brake pipe pressure reaches the chosen minimum value. The closing of the loaded valve prevents any further reduction of pressure in the emergency control valve chamber, so that, as brake pipe pressure continues to fall, the emergency control piston is forced from service to emergency position. Thus the automatic emergency is produced, not by venting the brake pipe, but by establishing the necessary differential on the emergency piston by ending the venting of the control chamber.

In the accompanying drawings there is illustrated a practical embodiment of the invention. The drawings are in diagram to the extent that all of the ports and passages appear in the same plane to permit their simultaneous functions to be observed. This convention, now quite familiar in the air brake art, requires some distortion of proportions, for obviously the ports can be more compactly arranged by locating certain of them in different planes. The drawings, however, show all the ports in their operative relations, the particular location of the ports being a matter of choice with the designer.

In the drawings,—

Fig. 1 is a longitudinal diagrammatic section of the complete triple valve including certain special chambers characteristic of the valve. The auxiliary reservoir, the emergency reservoir, the brake cylinder, and the brake pipe are not illustrated, since they do not differ in form from those used in standard practice. Their points of connection with the triple valve are illustrated. In this figure the parts are shown in release position before charging.

Fig. 2 is a fragmentary view of the triple slide valve and graduating valve in restricted release position;

Fig. 3 is a similar view showing the parts in quick service position;

Fig. 4 is a fragmentary view of the emergency control slide valve and graduating valve in service position;

Fig. 5 is a fragmentary view of the triple slide valve and graduating valve showing the parts in service lap position;

Fig. 6 is a fragmentary view of the emergency control slide valve and graduating valve, showing the parts in service lap position;

Fig. 7 is a fragmentary view of the triple slide valve and graduating valve in the position which they assume in full service and in emergency;

Fig. 8 is a fragmentary view of the emergency control slide valve and graduating valve in emergency position;

Fig. 9 is a fragmentary view of the change-over valve showing it at the start of its motion from left to right;

Fig. 10 is a similar view showing the position of the change-over valve at the extreme right hand limit of motion;

Fig. 11 is a similar view of the change-over valve, showing it in its position at the start of motion from right to left;

Fig. 12 is a fragmentary detail showing a replaceable choke bushing interposed in the charging passage of the main triple valve and used in lieu of the ordinary charging groove; and Fig. 13 is a fragmentary detail showing a change-over cap, in a position to permit these triple valves to function when coupled in trains with ordinary quick-acting valves such as the K-2 triple valve.

The entire mechanism is supported on a bracket structure 15, provided with attaching lugs 16. All pipe connections to the valve are made with the bracket 15. The auxiliary reservoir is connected at 17, brake pipe at 18, emergency reservoir at 19, and the brake cylinder at 20. The connection 21 is the brake cylinder exhaust and is threaded to receive a pipe leading to a retaining valve, not shown.

In the right of the bracket structure 15 is an emergency control chamber 22. The emergency control piston is balanced between the pressure in this chamber and brake pipe pressure. There is also an emergency actuation chamber 23 which furnishes air, under the control of the emergency control valve, to actuate the emergency build-up-delay valve and the emergency check.

The bracket 15 is provided with a ported seat 24, to which is bolted a casting 25. The emergency actuation chamber 23 opens on the ported seat 24, and the casting 25 carries a projecting shell 26 which extends into the emergency actuation chamber 23 and encloses the equalizing chamber 27. Adjacent the equalizing chamber 27, and also formed in the casting 25, is a reduction chamber 28. Chambers 27 and 28 are those which control the action of the quick service brake pipe vent valve, and the construction described permits their relative volumes to be changed by the use of interchangeable castings 25.

The opposite face of the casting 25, from that which seats against the bracket 15, is provided with a ported seat which receives the body 29 of the main triple valve. The opposite face of the bracket member 15 from the ported seat 24, is formed with a ported seat 30 to which the body 31 of the emergency control valve is bolted. There are numerous passages formed in the bracket 15 and casting 25, some of which lead from the pipe connections and chambers, just described, and others of which serve as connections between ports in the various valve mechanisms. These passages can best be described after the valve mechanisms have been set forth in detail.

The triple valve portion which is housed in the casting 29 conforms generally to standard practice. The front cap 32 is mounted at the end of the triple cylinder, whose bushing is shown at 33. The cap carries a graduating abutment 34 with graduating spring 35. The triple piston is shown at 36 and has the usual packing ring 37. It slides in the bushing 33 and in release positions is below the feed ports 38 which extend through the bushing 33, to and through choke plug 39 which is accessible by removing the plug 40 (see Figs. 1 and 12). The use of interchangeable choke plugs 39 permits accurate adjustment of the feed rate, and this rate is not subject to derangement by wear or by cleaning and repair operations.

A passage 41 leads from the choke plug to the space within the valve chamber bushing 42. The piston 36 is provided with a rib 43 which seats against the end of the bushing 41 in restricted recharge position, and this has a narrow groove 44 which then serves as a throttling groove to restrict flow from the brake pipe to the auxiliary reservoir.

The triple piston 36 is provided with a rod 45 which has spiders or shoulders 46, 47, to shift the slide valve 48 with the usual lost motion. The graduating valve 49 is confined so as to have only slight lost motion in a notch in the stem 45 and thus has motion relatively to the slide valve 48 of an extent determined by the lost motion between the piston rod and each valve. The lower end of the piston rod 45 engages, in normal release position, with a retard stop 50, which is sustained by a retard spring 51. The stop 50 is slidably mounted in a cap 52 bolted to the triple valve body 29. The stop 50 arrests the triple piston in normal release position, but the piston may move to restricted recharge and release position by compressing the spring 51.

Supported by and partly housed in an extension of the cap 52 is the quick-service valve mechanism. This consists of two parts, a quick service exhaust check valve, whose function is to effect a secondary closing of the quick service exhaust port in all positions of the triple valve except quick-service position, and a graduating discharge quick service valve, which, under the control of the equalizing chamber and reduction chamber, functions in quick service position to regulate the flow from brake pipe to atmosphere. It thus assists in producing the desired service reduction of brake pipe pressure and is so contrived as to terminate the venting flow so gradually that surging in the brake pipe will not be initiated.

The cap 52 is formed with a chamber 53 against the margin of which the equalizing discharge diaphragm 54 is clamped by means of a body casting 55. This is bolted to the cap 52 and is formed with a chamber 56 in which the lower face of the diaphragm is exposed. Mounted in the chamber 56 is a bushing 57 formed at its upper margin with an annular sharp edged valve seat 58 with which the diaphragm 54 coacts directly as a valve. A follower 59 which encloses a light thrust spring 60 seats on the upper face of the diaphragm 54 and urges this in a seating direction. The diaphragm 54 coacting with the seat 58 serves as the quick service valve.

Below the seat 58 the bushing 57 is formed with a conical seat 61 to receive a ball check valve 62. Beneath this is a fluted thrust member 63 terminating at its lower end in a flange or head which is in thrust relation with the diaphragm 64. The valve 62 is the quick service check and the diaphragm 64 is the quick service check diaphragm. The diaphragm 64 may act through thrust member 63 to unseat valve 62.

The diaphragm 64 is clamped in position by a threaded plug 65 which screws into the casting 55 and which is locked in position and sealed against leakage by a cap 66 threaded on an extension of the plug 65. A spring 68 acting against the flange on thrust member 63 urges this downward to permit the valve 62 to seat. Air discharged from the brake pipe passes successively through valve seat 58 and valve seat 61 to the space above the diaphragm 64 and thence through exhaust port 69 to atmosphere.

The build-up-delay valve is supported in casting 25 and includes a piston 70 which is slidable in a cylinder bushing 71. In its left hand position the piston seals against a gasket 72 and in its right hand position it carries a valve member 73 into sealing relation with a valve seat 74 and closes the passage through that seat. As hereinafter explained, this is the passage through which auxiliary reservoir air flows from the triple valve to the brake cylinder. Reverse flow through this passage is precluded by a ball check valve 75, which is also mounted in a portion of the casting 25.

The emergency control valve mechanism is mounted in body 31. It includes a piston 78 which works in a cylinder bushing 79. This bushing is provided with a rib 80 against which the piston 78 seats during recharge, a sealed joint being afforded by a gasket 81. A yielding stop 76 with spring 77 shifts the piston upward slightly to break this seal when recharge is completed. A graduating stem 82, with its spring 83, is housed partly in the piston 78 and partly in the connected piston rod 84. The piston rod is provided with lugs 85, 86, which actuate the emergency control valve 87 with limited lost motion. A graduating valve 88 is mounted on the emergency control valve 87 and is confined in a notch in rod 84. Bushing 79 is provided with a charging port 89, which is uncovered in the release position of the piston 78, and which communicates by way of a passage 90 with the emergency control chamber 22. The port 90 has a branch 91 which leads to and through bushing 92 in which the emergency control valve 87 is mounted.

The space above the piston 78 is closed by a cap structure 95. In the cap structure 95 is mounted the emergency check valve and its actuating piston. The check valve is shown at 96, and in coaction with its seat 97, controls communication from a chamber 98 connected with the brake pipe, to a chamber 99, which, according as brake cylinder pressure is below or above the chosen value, is connected with the brake cylinder or atmosphere, as hereinafter more fully explained. The valve 96 is in telescopic thrust relation with a piston 100 which is slidably mounted in the cylinder bushing 101. The chamber to the right of piston 100 is vented to atmosphere by a port 103. The chamber 102 is in communication with the chamber 99 when the valve 96 is closed, but when the piston 100 moves to the right, forcing the valve 96 from its seat, the gasket 104 on the right face of the piston 100, seals against a seat 105 and cuts off communication between the chambers 102 and 99. A minute bleed port 106 is formed in the piston 100 and thus serves gradually to vent pressure from the space at the left of the piston 100 to atmosphere, by way of the port 103.

Also mounted in the cap 95 is an automatic emergency mechanism, which functions to bring about an emergency application if brake pipe pressure is slowly reduced below a chosen value. This comprises a diaphragm valve 107, which is urged to seal against a seat 108 by a follower 109 which is urged downward by a spring 110. The spring 110 is housed in, and the follower 109 is guided by, a thimble 111 which is threaded into the cap structure 95. The lower face of the diaphragm valve 107 is subject to brake pipe pressure, and the spring 110 is so chosen that the diaphragm valve 107 will open at the desired pressure, here assumed to be ten pounds. The valve controls communication between the brake pipe and a port, hereinafter described, through which emergency control chamber 22 and the emergency actuation chamber 23 are vented when the piston 78 and valve 87 are in service position.

The valve which controls the flow of emergency reservoir air to the brake cylinder in the third stage of emergency, is mounted in the body 31, and includes the emergency reservoir by-pass check 113, which is held to its seat by a spring 114, and also by emergency reservoir pressure acting in chamber 115 above the valve. Mounted below the valve 113 is a piston 116 which has a stem 117, so dimensioned that when the piston 116 is forced upward, the stem 117 strikes and unseats the valve 113. The space 118 below the valve 113 is connected by a port 119 with the space above the piston 116, and the space 118 is, as will hereafter be fully explained, always in communication with the brake cylinder. It will be observed, therefore, that the piston 116 is urged downward by brake cylinder pressure and that the opening of valve 113 admits air directly from the emergency reservoir to the brake cylinder.

Mounted in the body 31 is a change-over valve mechanism which is actuated by a piston 121 which slides in a cylinder bushing 122, and which in its left-hand position seals against a rib 123 on the bushing 122. A gasket 124 is mounted on the piston 121 to insure a tight seal. In the right hand position the piston 121 seals against gasket 112. The piston is provided with a rod 125 with shoulders 126, 127, by which it actuates a slide valve 128 with limited lost motion. The valve 128 coacts with a seat formed on the valve chamber bushing 120. A small graduating valve 129, confined in a notch in the rod 125, is slidably mounted on the top of the slide valve 128. A cap 130 closes the space to the right of the piston 121 and carries a spring guide 131 on which is mounted a spring 132, confined between the cap 130 and the piston 121 and urging the piston to its left-most position. The piston 121 is subject to auxiliary reservoir and brake cylinder pressures acting in opposition to each other, and one function of the change-over valve is to terminate the second, and initiate the third stage of emergency when these pressures approach equalization. Spring 132 is designed accordingly.

Mounted in the cap 130 is a brake pipe exhaust opening valve, whose function is to control the brake pipe air which is vented from the brake pipe, in the first stage of emergency. In the normal position of the valve it directs the vented air to the brake cylinder, but when brake cylinder pressure rises to chosen value, here assumed to be fifteen pounds per square inch, the brake pipe exhaust opening valve shifts and vents the remaining brake pipe air to the atmosphere. The valve proper consists of a brake pipe exhaust check 133 urged closed by a spring 134, as well as by the pressure of the escaping brake pipe air when this is flowing. The valve coacts with a seat 135 and controls a passage through this seat from the space 136 to an independent exhaust port 137.

Above the valve 133 is a piston 138 which works in a cylinder bushing 139. The piston 138 is provided with an annular sealing rim 140 of less diameter than the piston, and arranged to seal normally against a gasket 141 under pressure exerted upon it by a spring 142. The space within the cylinder bushing 139 but outside the sealing rim 140, is connected by a passage 143 and port 144 with the space below the piston 138. The space within the sealing rim 140 is subject to brake cylinder pressure, as will hereafter be more fully explained.

Since port 144 is so located as to be blanked by initial downward movement of the piston 138, the effect is to subject the piston 138 to brake cylinder pressure over only a part of its area while it is in its uppermost position, and over its entire area immediately it starts to move downward. Piston 138 is in telescopic thrust relation with the stem 145 of the check valve 133, so that the piston assists in guiding the check valve. When the piston reaches its lowermost position, a gasket 147 seals on the seat 148 and precludes leakage of brake cylinder air around the piston 138 to the atmosphere. The springs 142 and 134 are so chosen that the piston 138 yields to brake cylinder pressure when this reaches the chosen value, here assumed to be fifteen pounds.

Associated with the brake pipe exhaust opening valve above described, is a check valve 149 closed by a spring 150 and also by brake cylinder pressure acting upon it in a closing direction. This valve, as will be later explained, is interposed in the path of brake pipe air from the emergency check valve 96 to the brake cylinder, and opens in the direction of such flow. It closes, however, to prevent backward flow of brake cylinder air, which would otherwise tend to occur after the brake pipe exhaust opening valve 133 has opened to atmosphere. Such back flow, if it occurred, would result in discharging brake cylinder air to the atmosphere.

Mounted in the lower portion of the emergency control valve body 31 is a quick-opening valve, which is controlled by the emergency control valve, and whose function is to provide a second path for the flow of auxiliary reservoir air to the brake cylinder. This flow, like the flow through the service passages of the triple valve, is under the control of the build-up-delay piston 70, but the provision of a second flow passage from the auxiliary reservoir to the brake cylinder, hastens the rise of pressure in the brake cylinder, in the second stage, and thus advances the time at which the third stage will commence.

The quick-opening valve comprises a combined piston and cup-shaped valve member 151, having a sealing gasket 152 on its upper face, which coacts with a valve seat 153, materially smaller in diameter than the piston portion. As will be later explained the annular space 154, surrounding the sealing rim of the seat 153, is in constant communication with the auxiliary reservoir. The space 155, within the annular seat rim, is in communication with the service port controlled by the triple slide valve 48. The piston is urged upward by a spring 156 and also by pressure admitted beneath it, through a passage 157, flow to which is controlled by the change-over slide valve 128, as will be hereinafter explained. To preclude leakage past the piston 151 when this is forced to its lowermost position, a gasket 158 is provided, and against this the piston seals when it moves downward and opens communication between the auxiliary reservoir and the brake cylinder.

The major moving parts of the valve have now been described, as to their general mechanical structure. The ports in the various slide valve seats and the communicating passages will next be traced, after which the porting of the slide valves can be described and explained.

The auxiliary reservoir connection 17 is connected by a branched passage 161 with the annular space 154 at the upper end of the quick-opening valve 151, and also with a groove 162 which leads around the triple valve bushing 42 and communicates with the interior of this bushing by means of a port 163. It is connected also with the space within the bushing 120 to the left of the change-over piston 121 and to the port 160 in the seat of the emergency control valve 87.

The brake pipe connection 18 is connected by a branched passage 164 with a space above the triple piston 36; also with the chamber 56 beneath quick-service vent diaphragm 54; also with the space above the emergency control piston 78, the chamber 98 to the right of the emergency check, and with the space beneath the diaphragm 107 of the automatic emergency valve.

Emergency reservoir passage 19 is connected by a branched passage 165 to a port 166 in bushing 42, controlled by slide valve 48; also to the space 167 above the emergency reservoir charging check 168; also to port 169 in the seat of the emergency control valve, and to a port 170 in the seat of the change-over valve, as well as to chamber 115 above the emergency reservoir by-pass check 113. It will be observed that the port 165 passes around the bushing 92 of the emergency control valve and the bushing 120 of the change-over valve, by way of grooves 171, 172.

The brake cylinder connection 20 is connected by way of a branched passage 173 with a brake cylinder port 174 in the triple valve bushing 42 and with the space between piston 70 and valve seat 74 of the build-up-delay mechanism. This branched port also leads to the space 118 below the emergency reservoir by-pass check 113, which is connected by port 119 with a space above the piston 116; also to the space within the brake pipe exhaust opening piston 138 and the space below emergency brake cylinder check 149 and the space to the right of change-over piston 121. In addition, a portion of the port 173 leads around change-over valve bushing 120, by way of a groove 175 and communicates with a port 176 in the seat of the change-over valve.

The brake cylinder exhaust connection 21 is connected by passage 177 with the brake cylinder exhaust port 178 in the seat of triple slide valve 48. There is an independent exhaust port 179 connected by a passage 181 with two groove passages 182, 183, which lead around the bushing 42 to exhaust ports 184, 185, respectively, each in the seat of slide valve 48.

Emergency reservoir charging port 186 is connected by a passage 187 with the space below the emergency reservoir charging check 168.

Port 188 is connected by a passage 189 with groove 191 which extends around bushing 92 and with a port 192 in the seat of the change-over slide valve 87.

Two ports 193, 194, spaced apart from each other in the seat of triple slide valve 48, are connected by branched passage 195 with the equalizing chamber 27 and with the chamber 53 above the equalizing discharge diaphragm 54.

Port 196 is connected by passage 197 with the reduction chamber 28.

Ports 198, 199, in the seat of slide valve 48 are jointly connected by a passage 201 with the space beneath diaphragm 64.

The service port 202 in the seat of triple slide valve 48 is connected by branched passage 203 with the space below the check valve 75 and also with the port in valve seat 153. The purpose of the check valve 75 is to prevent back flow from the brake cylinder to the auxiliary reservoir when emergency reservoir pressure is admitted in the third stage of emergency. It follows from this that emergency reservoir pressure equalizes with the pressure in the brake cylinder alone, and not with the pressure in the brake cylinder and auxiliary reservoir conjointly.

Turning now to the emergency control valve, the port 204 is connected by passage 205 and circular groove 206 with port 207 in the seat of change-over slide valve 128.

Port 208 in the seat of emergency control valve 87 leads to an independent exhaust passage 209.

Port 211 in the seat of emergency control valve 87 is connected by passage 212, and groove 213, to port 214 in the seat of change-over valve 128.

Port 215 in the seat of emergency control valve 87 is connected by passage 216 and groove 217 with a port 218 in the seat of change-over valve 128.

Port 219 in the seat of emergency control valve is connected by a groove 221 around bushing 92 and thence by passage 222 with the space to the left of build-up-delay piston 70, and also with the space to the left of the emergency check opening piston 100.

Port 223 in the seat of emergency control valve 87 is connected by circular groove 224 and passage 225 to the emergency actuation chamber 23.

Turning now to the change-over valve, port 226 in the seat of the valve 128, leads by way of groove 227 and passage 228, to the lower side of ball check valve 229, and thence by passage 231 to the port in the seat 108 of diaphragm valve 107.

Port 232 in the seat of the change-over valve is directly connected to atmosphere. Port 233 in the seat of the change-over valve is connected by passage 234, circular groove 235, and passage 236, with the space below the piston 116.

Port 237 in the seat of change-over valve 128 leads by way of groove 238 and passage 239, to the passage 157, and thus to the space below the quick-opening valve 151.

Leading from the space 99 to the left of the emergency check 96 is a passage 241 which is branched so as to connect with the space above the emergency brake pipe check 149 and the space below the brake pipe exhaust check 133.

Referring now to Figs. 1, 2, 3, 5 and 7, the porting of the triple slide valve and graduating valve will be described.

Slide valve 48 is provided with a restricted passage 244 which, in restricted release position, connects emergency reservoir port 166 with exhaust port 184, and causes a restricted venting of the emergency reservoir.

There is a through port 245 which is not controlled by the graduating valve 49. In normal release position this registers with emergency reservoir charging port 186. In full service lap, and in full service position and in emergency, this port registers with port 188, which leads to port 192 in the seat of the emergency control valve. Since port 192 is lapped by the emergency control valve in service lap position, and in all service positions, but not in emergency, the port 245 effectively coacts with the port 188 in emergency, at which time it establishes communication from the auxiliary reservoir to the emergency control chamber and accelerates movement of the emergency control valve to emergency position.

In the slide valve 48 there is a through port 246, which is controlled by the graduating valve 49. Port 246 coacts with the port 188 in normal release and restricted release positions, and is the port which vents the space below the emergency control piston 78 to the atmosphere, provided the emergency control piston remains in emergency position after the triple piston 36 has moved to release position.

Graduating valve 49 is provided with a passage 247 which has four communicating branches terminating on the lower face of the graduating valve, and the port 246 is controlled by the passage 247 in conjunction with certain exhaust ports in the valve 48, which will be referred to in detail.

There is a through port 248 in the valve 48 which is controlled by a through port 249 in the slide valve 49. These ports control the charging of the equalizing chamber, which occurs in normal release position.

There is a through port 251 which is controlled by one of the branches of the passage 247 in the graduating valve. This is the passage through which reduction chamber 28 is slowly vented to atmosphere in full release position, in which position the port 251 registers with the port 196.

There is a port 252 in the slide valve 48 which is controlled by the upper end of the graduating valve 49 and is the port through which, by its coaction with port 196, the reduction chamber is charged to equalizing reservoir pressure in restricted release position.

In the lower face of the triple valve there is a recess 253, which in quick-service position, connects the ports 194, 196, causing equalization between the reduction chamber 28 and the equalizing chamber 27. This recess functions also in service lap and in full service position of the triple valve, but at such time the quick service equalizing discharge port is closed by the action of the check valve 62.

There is a through port 254 in the triple slide valve 48 which is controlled by a through port 255 in the graduating valve 49. It is important to observe that the through port 255 does not communicate with the passage 247 also in the graduating valve 49. The ports 254 and 255, conjointly, control the port 198 in the seat, and in quick service position admit air through the passage 201 to the space beneath the quick-service opening-valve diaphragm 64.

There is, in the triple slide valve 48, a through port 256, which is controlled by one of the branches of the passage 247 in the graduating valve, and which communicates through a restricted passage 257, with a recess 258 in the lower face of the slide valve 48. In full release and restricted release the recess 258 connects the port 199 with the exhaust port 185 and thus vents the space beneath the diaphragm 64. In full service, full service lap and in emergency, the ports 199 and 185 are connected through the restricted port 257. In quick service the port 199 is blanked and auxiliary reservoir pressure is admitted through the ports 255, 254 and 198, to act against the lower side of diaphragm 64, force open check 62, and thus permit the quick service vent valve 54 to function.

The service port is shown at 259. It is a port extending through the valve 48 and is controlled by the service port 261 in the graduating valve 49. This is the port through which auxiliary reservoir air is admitted to the brake cylinder in quick service and full service positions. The graduating valve blanks this port in service lap position. In the face of the slide valve 48 are two cavities 260 and 262 connected by a constriction 263. These recesses coact with the ports 174 and 178.

Referring now to Figs. 4, 6 and 8, the porting of the emergency control valve will be described.

In the face of this valve there is a recess 264, which in release, service and lap positions, connects the ports 160 and 204. In the emergency position it connects the ports 204 and 208.

Above the recess 264 there is a recess 265 which in release, service and lap positions, connects the ports 208, 211, and which in emergency position connects the ports 211 and 169.

There is a through port 266 which is controlled by the graduating valve 88, and is closed by this valve in both release positions and in lap position. It is opened by the graduating valve in quick service, full service and emergency positions. In release positions and in emergency positions the port 266 does not register with any port in the seat of the valve 87, but in quick service, full service and lap positions, it registers with the port 215. This is the port which slowly bleeds the emergency actuation chamber 23 and the emergency control chamber 22 during service application.

In the face of the valve 87 there is a recess 267 which functions only in emergency, and then connects port 219 to port 223. In this position it allows emergency actuation chamber air to act against the emergency build-up-delay piston and the emergency check piston.

There is a notch 268 at the end of the slide valve 87, which in all positions except emergency, connects the interior of the bushing 92 with the emergency actuation chamber, and establishes a connection from this chamber to the interior of the bushing. It thus provides for the charging of the emergency actuation chamber and also for the reflux of air from this chamber to the interior of the bushing 92 during service applications.

The special functions of the recesses 264, 265, will be brought out in the description of operation, as they function in conjunction with certain recesses in the change-over valve yet to be described.

Referring now to Figs. 9, 10 and 11, the change-over valve is provided with a recess 271, which, in the extreme right hand position of the valve, connects ports 207, 237.

There is a through port 272 which in the left-hand position of the valve, connects the interior of the bushing 120 with port 237, and which in the right hand position of the valve is blanked.

There is a through port 273 in the change-over valve 128, which in the left hand position of the valve is blanked at its lower end and which as the valve moves, registers with the port 170. There is a through port 274 terminating in a recess on the lower face of the valve which in the left hand position of the valve 128 connects the ports 226 and 218, and which in the right hand position of the valve connects the ports 218 and 176. In the riding or graduating valve 129 there is a recess 275, which, during the motion of the valve 128 from right to left, connects the ports 273 and 274, and thus establishes the connection between the ports 170 and 176. At all other times the upper ends of the ports 273 and 274 are blanked by the valve 129.

Between the ports 273, 274, is a recess 276, which, in the left hand position of the valve, connects the ports 214 and 233, and in the extreme right hand position of the valve connects the ports 233 and 232. The functions of the various ports in the change-over valve will be brought out in the description of the operation.

By referring to Fig. 1, it will be observed that the gasket 72, against which the build-up-delay piston seats, is held in place by a removable cap 281, and that the casting 25 is provided with an apparently useless port 282. Also that the port 222 connects with the space to the left of the piston 70 through a passage 283 formed in the cap 281; furthermore, that there is an apparently useless port 284 in cap 281. This detail of construction is not material to the action of the valve where valves of this improved type are used together. It is, however, important where such valves are used on cars, coupled in trains, with ordinary triple valves, for under such conditions the build-up-delay feature must be dispensed with. This result is accomplished by reversing the cap 281, as shown in Fig. 13, that is, seating the cap in a position 180° from its normal position. In this position the port 222 is connected with atmosphere through port 284, and the passage 283 connects the space, to the left of the piston 70, to atmosphere, by way of passage 282.

DESCRIPTION OF OPERATION.

The operation of the device will be de-

Normal charging and release.

Brake pipe air enters at the connection 18 and flows by way of passage 164 to the space above the triple piston 36, through the feed port 38 and the choke 39, port 41 to the valve chamber within bushing 42. It is assumed that the rise of brake pipe pressure is not sufficient to cause piston 36 to overpower spring 51 so that the triple valve stands in the position shown in Fig. 1. It will be observed also that brake pipe air flows through a branched passage 164 to the space below the quick service diaphragm 54. Under certain conditions this may raise the diaphragm but at such time no vent flow can occur as the valve 62 is held to its seat. This is the case because the space below diaphragm 64 is vented to the atmosphere. Air from the interior of the bushing 42 flows through the port 163, groove 162, passage 161 and thence to the auxiliary reservoir connection 17.

Air also flows from the interior of the bushing 42 through the port 245, slide valve 48, and thence through port 186 and passage 187 to the check valve 168, which it opens, and then continues its flow by way of passage 165 to the emergency reservoir connection 19, charging this reservoir. Air also flows from the interior of the bushing 42 through the port 249 in the graduating valve, port 248 in the slide valve, port 193 in the seat, and passage 195 to the equalizing chamber 27 thus charging this chamber. From passage 195 there is a constantly open communication to recess 53 above the diaphragm 54. The reduction chamber 28 is open to the atmosphere by way of passage 197, port 196, port 251 in the slide valve, port 247 in the graduating valve, port 256, constriction 257, and the independent exhaust port 185 in the slide valve seat.

Space 67 below the quick service check diaphragm 64 is open to the atmosphere by way of passage 201, port 199, recess 258 and independent exhaust port 185. Consequently valve 62 is seated.

The brake cylinder is a free exhaust to the atmosphere as follows:

Brake cylinder connection 20, passage 173, port 174, cavity 260, port 178, passage 177 to brake cylinder exhaust connection 21. As brake cylinder pressure falls, pressure in the passage 203, which communicates with the space above the quick opening valve 151, is reduced by way of check valve 75, valve seat 74 and passage 173, which, being in communication with the brake cylinder, is at this time being exhausted to the atmosphere.

Pressure arriving through connection 18 and passage 164, flows to the chamber above the emergency control piston 78 and thence through the feed port 89 and passage 91 to the space within the bushing 92. The emergency control chamber 22 is connected by the passage 90 with the passage 91 and hence is charged. Port 223 is uncovered by the slide valve 87 in charging position and consequently the emergency actuation chamber 23 is charged through this port and the passage 225 at the same time that the emergency control chamber 22 is being charged. The gasket 81 and the stop 76 are used so that during charging the piston 78 will seal, by means of the gasket, and limit the charging rate to the capacity of the charging port 89. When charging is completed the pressures on the opposite sides of the piston 78 approach equalization and the spring 77 breaks the seal so that the entire lower area of piston 78 is subjected to control chamber pressure. This prevents the possible freezing of the gasket 81 to the seat 80 in cold weather. If the gasket were used without the yielding stop the effective area of the piston subject to emergency control chamber pressure would be suddenly increased as the gasket unsealed at the commencement of a service application. This sudden increase of area would be likely to produce an undesired emergency application. Hence the use of the yielding stop in conjunction with the gasket and piston is conducive to smooth service action and reduces the tendency of the valve to freeze fast in cold weather.

It will be observed that passage 164 communicates with the space to the right of the emergency check 96 and that this check is closed in release and recharge positions. The air also flows to the space below the diaphragm 107 which yields when the pressure rises to 10 lbs. (or any other selected value). When the diaphragm rises air flows through seat 108 to the space above the ball check 229, where flow is arrested. While the auxiliary reservoir is being charged, as already described, air flows through a branch of passage 161 to the space within the bushing 120 to the left of the change over piston 121.

Air flows from the chamber within the bushing 120 through the port 272, port 237 and passage 239, to the space below the quick opening valve 151. This pressure and the pressure exerted by the spring 156, hold the valve 151 seated. Air also branches off from the port 161 to the annular space 154 around the upper end of the quick opening valve 151. The flow is arrested here since the valve is held closed. Auxiliary reservoir pressure branches off from port 161 to port 160 and thence by cavity 264, port 204 and passage 205 to port 207 which communicates with cavity 271 in the change-over valve 128. Here flow is arrested.

When pressure within bushing 120 builds up to about 5 lbs. spring 132 is compressed, piston 121 moving to the right until it seats against gasket 112. The position then assumed by the parts is shown in Fig. 10. In this position port 272 in the slide valve moves out of registry with port 237 and cavity 271 in slide valve 128 establishes communication between the ports 207 and 237. This interrupts the communication to the space beneath the quick-opening valve 151 and immediately reestablishes it by way of passage 205, port 207, cavity 271, port 237 and passage 239.

From the above it follows that so long as the vent valve piston 78 is in release service or service lap position, the quick opening piston 151 is always subjected in its lower face to auxiliary reservoir pressure regardless of the position of the change-over valve. It will be observed that the pressure in the emergency reservoir is communicated to a port 169 in a seat of the emergency control valve 87 and that this port is blanked in release service and service lap positions. There is also a communication from this reservoir to the space above the emergency reservoir by-pass check 113. There is also a communication by way of groove 172 to port 170 in the seat of the change-over piston, and this port is blanked in both the limiting positions of the change-over slide valve 128. The purpose of the graduating valve 129 which coacts with the change-over valve 128 is to disconnect the ports 273 and 274 upon movement of the change-over valve to the right and to connect them upon movement of the change-over valve to the left. Consequently when the pressure in the bushing 120 builds up to 5 lbs. and piston 121 starts to the right, cavity 275 in the graduating valve is shifted to destroy communication between the ports 273 and 274. It follows that when port 273 moves to the right over emergency reservoir port 170 no flow occurs.

The space below the emergency reservoir by-pass piston 116 is connected to the atmosphere in charging position both when the change-over piston 121 is to the left and to the right. When the piston is to the left, connection to atmosphere is by way of passage 236, groove 235, passage 234, port 233, cavity 276 in change-over valve 128, port 214. passage 212, port 211, cavity 265 in the change-over piston, and exhaust port 208. When the change-over valve 128 is to the right the path of flow is the same as far as port 233, from which the flow is by way of cavity 276 to independent exhaust port 232.

The space above the emergency brake cylinder check 149 is open to the atmosphere through passage 241 which communicates through valve seat 105 with the space to the right of piston 100. This space is vented to atmosphere by port 103. Space 136 below check valve 133 is vented in the same manner. The space to the left of the emergency build-up-delay piston 70 is open to the atmosphere by way of passage 283, passage 222, the space to the left of piston 100, bleed port 106, and port 103. The space 118 below the emergency reservoir by-pass check 113, and the space above the emergency reservoir by-pass piston 116, is vented to atmosphere by reason of communication of these spaces with the brake cylinder port 173. Other spaces which are similarly in constant communication with the brake cylinder are the space to the right of the change over piston 121, the space beneath the check valve 149, the space beneath check valve 113, and the space above the brake pipe exhaust opening piston 138.

It will be observed that the port 192 in bushing 92 is blanked in service, service lap and in release positions and is uncovered in emergency position. Since the port 192 is connected with port 188 in the seat of triple slide valve 48, it is connected to atmosphere in release position of the triple valve by way of ports 246, 247, 256, 257, 258 and 185. It follows that if triple piston 36 moves to release position while emergency control piston 78 remains in emergency position, the space within bushing 92 will be vented to atmosphere, reducing the pressure on the lower side of piston 78 and assuring that it will move to release position immediately. On the other hand if piston 78 moves down simultaneously with piston 36 the venting of the space within bushing 92 will not occur. It is important that the pressures within the bushing 92 and within the bushing 42 be equal after an emergency application, in order to assure simultaneous movement of pistons 36 and 78 to release position. This is accomplished by port 245 in slide valve 48, which in full service position registers with port 188 which as has already been explained, is in direct communication with port 192 in bushing 92. Since port 192 is uncovered by valve 78 in emergency position, there is a direct equalizing connection in emergency position between the interior of the bushing 42 and the interior of the bushing 92. As soon as brake cylinder pressure has been released to 15 lbs. (the assumed pressure at which the vented brake pipe air is diverted from brake cylinder to atmosphere in emergency) piston 138 moves upward allowing check valve 133 to close.

*Restricted recharge and release.*

If after an application the rise of train pipe pressure is quite rapid, as it is at the forward end of the train, brake pipe pressure acting on piston 36 will preponderate to such an extent over auxiliary reservoir pressure as to overpower the retard spring 51. The effect of this is to cause the piston 36 to move until rib 43 seals against bushing 42, at which time the choke port 39 and the groove 44 in series control the charging rate. The rate is thus slower than the normal charging rate and may be made very slow by sufficiently restricting the groove 44. The overtravel of the piston 36 carries the slide valve 48 to the position shown in Fig. 2 in which the constriction 263 is interposed in the path of flow from the brake cylinder port 174 to the exhaust port 178. Thus restricted release occurs simultaneously with restricted recharge.

Referring further to Fig. 2, it will be observed that through port 245 in the slide valve 48 has moved out of register with the emergency reservoir charging port 186, and at the same time the emergency reservoir port 166 is placed by the recess 244 in communication with the independent exhaust port 184. The recess 244 is so dimensioned that during a restricted recharge following a full service application, there will be discharged from the emergency reservoir sufficient air to reduce the pressure by 10 lbs. per square inch. As has been explained, the purpose of reducing the pressure in the emergency reservoir is to reduce the reapplication tendency following restricted recharge when the engineer moves his brake valve to running position. Equalization of pressure through the port 245 between the auxiliary reservoir and the emergency reservoir which occurs in normal release position, following restricted release, tends to dissipate or neutralize any overcharge of the auxiliary reservoir which may have occurred during restricted recharge. For a similar reason the equalizing chamber port 194 is blanked in restricted release. This chamber is partially vented in the service application and not being charged during restricted release is available at the conclusion of restricted release to absorb part of the overcharge from the auxiliary reservoir as the valve moves back to normal release position.

In restricted release position port 252 in the slide valve 48 registers with the reduction chamber port 196 and therefore this chamber is charged to the same pressure as the auxiliary reservoir. As already explained, the pressure so accumulated in the chamber is bled away at a restricted rate in normal release position.

So long as the chamber 28 is fully charged the quick service vent can not function, and if the reduction chamber 28 is partially charged or only partially discharged after being charged, the time period of opening of the service vent will be correspondingly shortened. The function of the emergency control valve is the same in restricted recharge and release as in normal recharge and release.

*Quick service position.*

This position is illustrated in Figs. 3 and 4. Referring first to the triple valve portion, the piston 36 first moves upward sufficiently to blank the charging port 38. There is sufficient lost motion in the graduating valve 49 to permit the port to be blanked before the graduating valve is moved. Next the graduating valve and the slide valve 48 are picked up successively, and motion continues until the piston 36 is arrested by the graduating stem 34. In this position the brake cylinder port 174 is disconnected from the exhaust port 178 so that exhaust is terminated. At the same time the reduction chamber port 196 and the equalizing chamber port 194 are connected by the recess 253 in the slide valve 48. Assuming that the reduction chamber is at atmospheric pressure, the connection of these two ports will result in a reduction of pressure assumed to be 7 lbs. in the space above the diaphragm. At the same time auxiliary reservoir air flows by way of port 255 in the graduating valve 49, port 254 in the slide valve 48, port 198 in the seat, and passage 201 to the space below diaphragm 64, forcing this diaphragm up and unseating the valve 62. It follows that unless the valve 62 should reseat sooner diaphragm 54 will rise from the annular seat 58 and allow brake pipe air to flow to the atmosphere until brake pipe pressure has been reduced 7 lbs. If, however, the piston 36 should start to overpower the graduating spring 35, the space below the diaphragm 64 would be vented to atmosphere by port 256, restriction 257 and exhaust port 185. This would cause valve 62 to seat and terminate the venting of brake pipe pressure. Consequently, there is sufficient protection against the initiation of emergency action by excessive local venting through the quick service vent.

In quick service position the service port 259 and the service graduating port 261 are alined, the former being partially in register with the service port 202 in the seat. Thus auxiliary air flows to the brake cylinder and at a slower rate than would occur if there were full registry with port 202.

The purpose of the service vent is to cause each triple valve to assist in producing a local service reduction and to prevent or reduce pressure surges in the brake pipe by means of local venting. The vent is so proportioned that unless it is necessary to vent an excessive amount of air because of local pressure surges, the local venting will be just sufficient to cause the triple valve to start from quick service position toward full service position. In other words, to start to overpower the graduating spring 35. Thus the local venting is designed to condition the triple valve so that it is just ready to move to full service position, but will not do so from the action of the service vents alone because the service vents are closed each by the corresponding valve 62 the moment the valve commences to move from quick service to full service position.

In the emergency control valve portion the piston 78 moves upward until arrested by the graduating stem 82, at which time the graduating valve 88 uncovers the port 266. The port 266 is then in communication with port 215 and air from the emergency control chamber 22 and the emergency actuation chamber 23, both of which are then in communication with the space within bushing 92, flows to the brake cylinder by way of port 266, port 215, passage 216, groove 217, port 218, port 274 in the change-over slide valve 128, port 176, groove 175 to brake cylinder port 173. Since the brake cylinder port 173 is in constant communication with the space above the piston 138, the rise of brake cylinder pressure will be communicated directly to the piston 138 at a chosen value assumed to be 15 lbs. When the piston commences to overpower the spring 142 the seal at 140 will be broken. This will expose an increased piston area to brake cylinder pressure so that the piston 138 moves suddenly to its downward limit of motion where the gasket 147 seals on the seat 148. Check valve 135 is then opened ready to vent brake pipe pressure directly to atmosphere in the event of an emergency application.

*Full service position.*

If the brake pipe pressure is reduced with sufficient rapidity either through the action of the engineer's brake valve or through the action of the quick service vents, an emergency application will be imminent, but before this occurs the triple piston 36 will move up overpowering the spring 35 and seat against the head gasket. In this position the local venting will be terminated because the space below the diaphragm 64 will be vented and the valve 62 will close. This position of the triple valve is shown in Fig. 7, and in this figure it will be observed that the service port 259 registers directly with the service port 202 in the seat, instead of only partially registering, as is the case in quick service.

The reduction chamber port 196 and the equalizing chamber port 194 are connected by the cavity 253, and at the same time the communicating tail port 193 is uncovered by the slide valve 48 so that the pressure in the chambers 27 and 28 may freely equalize with the auxiliary reservoir pressure. Thus these two volumes are rendered effective to assist in the brake application. It will also be observed that when in this position port 245 registers with port 188, thus establishing a direct communication to the port 192 in the seat of the emergency control slide valve 87. In service positions of the emergency control valve this port is lapped by the slide valve. The position of the vent valve piston remains unchanged but the change-over valve functions as equalization of brake cylinder and auxiliary reservoir pressure is approached. It will be recalled that piston 121 is subject on its left side to auxiliary reservoir pressure and on its right side to brake cylinder pressure, and that spring 132 is designed to function when auxiliary reservoir pressure preponderates by only a slight margin, here assumed to be 5 lbs. per square inch. When this differential is reached the piston 121 moves to the left. As this motion commences the recess 275 in the graduating valve connects the ports 273 and 274, and as the port 273 registers with the emergency reservoir port 170 emergency reservoir air is momentarily admitted by way of ports 170, 273, 275, 274, 176, groove 175 and passage 173, to the space to the right of the change-over piston 121, thus accelerating the movement of this piston to the left. When this movement takes place the cavity at the lower end of port 274 in the change over valve connects ports 218 and 226 and diverts the flow of air from the emergency control chamber and the emergency application chamber to the brake pipe. As will be recalled, this air was flowing to the brake cylinder prior to the movement of the change-over valve. The size of the various ports are so chosen that the venting continues at a service rate. It will be observed that the check valve 133 remains open so that if an emergency application follows a full service application, brake pipe will be immediately vented to atmosphere.

*Service lap position. (See Figs. 5 and 6.)*

When the triple valve moves to lap position from service, the graduating valve moves to blank the service port in the slide valve, the slide valve remaining at rest. If the triple slide valve had been moved to full service position prior to the lapping movement of the graduating valve, the space below diaphragm 64 would already have been connected to atmosphere through the conection of ports 199, 257, and 185. If, however, the slide valve 48 had been moved only to quick service position (see Fig. 3) and the graduating valve then moved to lapping position leaving the slide valve 48 unmoved, the space below the diaphragm 64 would, upon such movement of the graduating valve, be connected to atmosphere as follows: Port 198, port 254 in the slide valve 48, port 247 in the slide valve, ports 256 and 257, to exhaust port 185. Thus in lap position, following quick service, as contradistinguished from full service, the quick service vent is closed by the valve 62. As will be seen from the position of valve 48 in Fig. 3, the ports 196 and 194 remain connected in quick service position so that if brake pipe pressure has not been reduced to an amount not exceeding the equalized pressure in chambers 27 and 28 when lapping occurs, the diaphragm 54 will function to produce a local train pipe venting on the next applying graduation. This involves merely the movement of the graduating valve from lap position to quick service position (see Fig. 3), and in this position pressure is again admitted to the lower face of the diaphragm 64 to open the valve 62. It follows that if the valve moves to full service position the local venting action is permanently suspended. If the valve is lapped after a quick service application and then another brake applying reduction occurs, the quick service vent will function provided a 7 lb. reduction has not occurred. In lap position the emergency control graduating valve 88 moves downward sufficiently to blank the port 266, and thus terminates the venting of chambers 22 and 23.

*Emergency—first stage.*

Sudden reduction of brake pipe pressure causes the triple valve to move at once to full service position (Fig. 7). The motion is so sudden that the quick service vent valve has no opportunity to act and the volumes of the equalizing chamber 27 and the reduction chamber 28 are merely added immediately to the auxiliary reservoir volume. The flow of auxiliary reservoir air through the triple valve to the brake cylinder port is exactly as described in full service, except that through the action of the emergency control valve the brake cylinder port is temporarily obstructed so that no auxiliary reservoir air actually flows to the brake cylinder in the first stage of emergency.

The emergency control piston 78 moves upward to the extreme limit of its motion, and at the same time the triple piston 36 moves to the limit of its motion. The emergency control piston 78 overpowers the graduating spring 83 and seats against the head gasket. The position assumed by the emergency control valve and graduating valve is shown in Fig. 8. In this position the slide valve 87 uncovers the port 192 so that the space within the bushing 92 is immediately placed in communication with the space within the bushing 42 by way of port 245 in slide valve 48, port 188, passage 189, groove 191, and port 192. As has been explained, this equalization of pressure within the two bushings is to assist simultaneous releasing movement of the two pistons.

The venting of chambers 22 and 23 does not occur in emergency position, since port 266 is blanked on the seat of the valve 87. Also port 223 is disconnected from the space within the bushing 92 and is connected by recess 267 with port 219 which leads by way of groove 221 and passage 222 to the space to the left of the emergency delay piston 70. Emergency actuation chamber air is thus admitted to act against the left end face of emergency delay piston 70, forcing this piston to the right and closing valve 73 against seat 74. The effect is to arrest the flow of auxiliary reservoir air to the brake cylinder. This otherwise would occur by way of port 202, passage 203, check valve 75 and through the seat 74. The passage 222 also communicates with the space to the left of emergency piston 100 which is forced to the right, unseating the emergency check 96 and allowing brake pipe air to flow through the seat 97, port 241, check valve 149, to the brake cylinder port 173. If this flow were allowed to continue to equalization of brake cylinder, and brake pipe pressures a brake cylinder pressure of approximately 32 lbs. would be obtained, but when brake cylinder pressure reaches the chosen value (here assumed to be 15 lbs.), piston 138 moves downward and unseats check valve 133, and thereafter the vent flowing through port 241 is diverted from the brake cylinder and passes to the atmosphere by way of chamber 136 and exhaust passage 137. The pressure acting on the left faces of the pistons 70 and 100 is bled away at a restricted rate through the port 106, and passage 103. The port 106 is so designed that emergency actuation chamber pressure will be reduced to 15 lbs. in about seven seconds, and when this occurs piston 70 will move to the left, opening valve 73. This initiates the second stage of emergency.

*Emergency—second stage.*

The position and function of the triple valve portion remain unchanged, but the opening of the valve 73 now permits auxiliary reservoir air to flow directly to the brake cylinder. Piston 106 will be held to the right against the resistance of the relatively light closing spring of check valve 96 until the emergency actuation chamber pressure is virtually dissipated. Thus the brake pipe venting continues after the first stage of emergency has terminated.

When the slide valve 87 moves to its uppermost position cavity 264 connects port 204 to the exhaust port 208. The space below the quick opening valve 151 is thus connected to atmosphere as follows: passage 157, passage 239, groove 238, port 237, cavity 271, port 207, groove 206, passage 205, port 204, cavity 264, exhaust port 208.

Remembering that the annular space at the upper end of the valve 151 is constantly subjected to auxiliary reservoir pressure, the venting of pressure below the valve 151 allows this to open so that auxiliary reservoir air flows directly into passage 203, which is the service passage of the triple valve. This flow is blocked in the first stage of emergency by valve 73, but upon the opening of this valve at the commencement of the second stage two paths are opened for flow from the auxiliary reservoir to the brake cylinder, one through the service port of the triple valve, and the other through the quick opening valve 151. This accelerates the rise of brake cylinder pressure in the second stage of emergency. It will be remembered that the change-over piston 121 is subject on its left to auxiliary reservoir pressure and on its right to brake cylinder pressure, and that the spring 132 has a strength assumed to be such that when auxiliary reservoir pressure falls and brake cylinder pressure rises to within 5 lbs. per square inch of equalization, the piston 121 will move to the left. This motion is used to initiate the third stage of emergency.

Emergency—third stage.

The position of the triple valve remains unchanged, but flow of auxiliary reservoir air ends when equalization with the brake cylinder occurs. The motion of the change-over valve to the left once more admits auxiliary reservoir air through port 272, port 237, groove 238, and passages 239 and 157 to the space below the quick opening valve 151. This valve therefore closes, such closing being a necessary precedent to release. At this time the change-over valve moves to the position shown in Fig. 1. Air flows from the emergency reservoir to the space below piston 116 as follows: passage 165, groove 171, port 169, cavity 265, port 211, passage 212, groove 213, port 214, cavity 276, passage 234, groove 235 and passage 236. Piston 116 is thus forced upward unseating check 113 and allowing emergency reservoir air to flow from passage 165 to brake cylinder port 173. Equalizing flow back into the auxiliary reservoir is precluded by check valve 75 and accordingly emergency reservoir pressure equalizes with the brake cylinder volume only. Piston 116 will drop allowing valve 113 to close when full equalization between the emergency reservoir and brake cylinder is accomplished.

The three emergency functions above described take place almost instantaneously except for the seven seconds delay which is intentionally produced to allow the slack to be taken up by a 15 lb. application.

Release after emergency.

In release after emergency the pistons 36 and 78 ordinarily will move downward to release position simultaneously, because in emergency position the pressures below the two pistons are equalized. If the triple piston should move to release position while the emergency control piston 78 remains in emergency control position, the effect will be, as already explained, to vent pressure from the chamber 92 to atmosphere and assure the immediate movement of piston 78 to release position.

Automatic emergency.

In certain circumstances, notably where a car or string of cars are cut out and the angle cocks closed on the end of the train, it is desirable to have means to produce an emergency application when brake pipe pressure falls below the desired minimum. Ordinarily the leakage in such a string of cars is sufficient to produce service application, but the fall of brake pipe pressure is not rapid enough to cause an emergency application. Thus as pressure in the brake pipe falls from leakage, the pistons 36 and 78 move to service position, but the piston 78 does not move to emergency position because the port 266 is adequate to vent the chambers 22 and 23 at the service rate. It will be recalled, however, that as the brake cylinder and auxiliary reservoir approach equalization, the change-over valve 128 shifts to divert the venting flow from chambers 22 and 23 from the brake cylinder port to the brake pipe by way of passage 228, check valve 229 and passage 231, which leads to the seat 108 of the diaphragm valve 107. Thus when brake pipe pressure falls beyond the point of approximate equalization above mentioned, the venting flow from the space within bushing 92 is subject to the control of diaphragm 107. This will be closed by the spring 110 when the pressure in the brake pipe port 164 reaches a critically low value. The effect is first to hold the slide valve 87 seated against auxiliary reservoir pressure delivered by port 160 and emergency reservoir pressure delivered by port 169, and further to prevent the fall of pressure in the space below the piston 78. Continued reduction of brake pipe pressure which acts on the upper side of piston 78 after the termination of emergency actuating and control chamber air flow will cause this piston to move to its extreme uppermost position against the resistance of spring 83 and will thus initiate an emergency application. It will be observed that this automatic emergency is secured by terminating the venting from the chambers 22 and 23 and not by venting the train pipe, and accordingly the use of the device is not attended with any harmful effects such as sometimes occurs with the use of a brake pipe vent.

*Special adjustment for transition period.*

When a car is equipped with the triple valve forming the subject matter of this application, it must be connected in trains with cars equipped with ordinary triple valves and the seven seconds delay in emergency must be eliminated. To accomplish this the cap 281 is removed and reversed, as shown in Fig. 13. This connects the space to the left of piston 70 to the atmosphere by way of passages 283 and 282 and connects the passage 222 to atmosphere by passage 284. Under these conditions the piston 72 remains to the left at all times and the flow of auxiliary reservoir air to the brake cylinder during the initial stage of emergency is not delayed. At the same time emergency actuation chamber pressure is vented much more quickly and accordingly piston 100 holds the brake pipe vent valve 96 open for only a relatively short period. The effect is to produce a rapid sequence of operations in the emergency function which will quite closely simulate the action of the present standard triple valves.

It is understood that the embodiment illustrated in the drawings, and above described in detail, is intended to be illustrative, and that the invention is not limited to the specific embodiment shown and described.

What is claimed is,—

1. The combination with a triple valve characterized by normal recharge upon normal releasing pressure and by restricted recharge upon higher releasing pressure in the brake pipe, of a pressure-actuated valve controlling a service vent from the brake pipe and comprising a sharp annular seat and a combined diaphragm and valve coacting with said seat and subject to brake pipe pressure acting in an opening direction; and an equalizing chamber arranged to be charged in normal recharge position; a reduction chamber arranged to be vented to atmosphere in normal recharge position and charged in restricted recharge position, the triple valve structure having ports controlled by the triple valve and opened thereby in quick service position to connect said chambers and cause their equalized pressures to act on said diaphragm in a closing direction.

2. The combination with a triple valve characterized by normal recharge upon normal releasing pressure and by restricted recharge upon higher releasing pressure in the brake pipe, of a pressure-actuated valve controlling a service vent from the brake pipe and comprising a sharp annular seat and a combined diaphragm and valve coacting with said seat and subject to brake pipe pressure acting in an opening direction; an equalizing chamber arranged to be charged in normal recharge position; a reduction chamber arranged to be vented to atmosphere in normal recharge position and charged in restricted recharge position, the triple valve structure having ports controlled by the triple valve and opened thereby in quick service position to connect said chambers and cause their equalized pressures to act on said diaphragm in a closing direction; a check valve normally closing against outflow through said service vent; and a diaphragm motor rendered active by the triple valve in quick service position to unseat said check valve.

3. The combination with a triple valve characterized by normal recharge upon normal releasing pressure and by restricted recharge upon higher releasing pressure in the brake pipe, of a pressure actuated diaphragm valve controlling a service vent from the brake pipe and subject in an opening direction to brake pipe pressure; an equalizing chamber arranged to be charged in normal recharge position; a reduction chamber arranged to be vented to atmosphere in normal recharge position and charged in restricted recharge position, the combined volumes of said two chambers being so small relatively to the displacement of the diaphragm valve that when the valve moves in a closing direction under the equalized pressure in the two chambers an appreciable reduction of the equalized pressure results, the triple valve structure having ports controlled by the triple valve and opened thereby in quick service position to connect said chambers and cause their equalized pressures to act on said diaphragm in a closing direction.

4. The combination with a triple valve characterized by normal recharge upon normal releasing pressure and by restricted recharge upon higher releasing pressure in the brake pipe, of a pressure-actuated diaphragm valve controlling a service vent from the brake pipe and subject in an opening direction to brake pipe pressure; an equalizing chamber arranged to be charged in normal recharge position; a reduction chamber arranged to be vented to atmosphere in normal recharge position and charged in restricted recharge position, the combined volumes of said two chambers being so small relatively to the displacement of the diaphragm valve that when the valve moves in a closing direction under the equalized pressure in the two chambers an appreciable reduction of the equalized pressure results, the triple valve structure having ports controlled by the triple valve and opened thereby in quick service position to connect said chambers and cause their equalized pressures to act on said diaphragm in a closing direction; and secondary means controlling said service vent and itself controlled by the triple valve in such manner as to close the vent except in quick service position of the triple valve.

5. The combination with a triple valve characterized by normal recharge upon normal releasing pressure and by restricted recharge upon higher releasing pressure in the brake pipe, of a pressure-acting diaphragm valve controlling a service vent from the brake pipe and subject in an opening direction to brake pipe pressure; an equalizing chamber arranged to be charged in normal recharge position; a reduction chamber arranged to be vented to atmosphere in normal recharge position and charged in restricted recharge position, the combined volumes of said two chambers being so small relatively to the displacement of the diaphragm valve that when the valve moves in a closing direction under the equalized pressure in the two chambers an appreciable reduction of the equalized pressure results, the triple valve structure having ports controlled by the triple valve and opened thereby in quick service position to connect said chambers and cause their equalized pressures to act on said diaphragm in a closing direction; a check valve normally closing against outflow through said service vent; and a diaphragm motor rendered active by the triple valve in quick service position to unseat said check valve.

6. A valve for air brakes comprising in combination a main triple valve portion which simultaneously exhausts the brake cylinder and recharges the auxiliary reservoir, and in another position admits auxiliary reservoir air to the brake cylinder; an emergency control valve arranged to respond to rapid reductions of brake pipe pressure to vent the brake pipe; and a valve controlled by the emergency control valve, and opened thereby in emergency position of the control valve to admit auxiliary reservoir air to the brake cylinder independently of the main triple valve portion.

7. A valve for air brakes comprising in combination a main triple valve portion which simultaneously exhausts the brake cylinder and recharges the auxiliary reservoir, and in another position admits auxiliary reservoir air to the brake cylinder; an emergency control valve arranged to respond to rapid reductions of brake pipe pressure to vent the brake pipe to the brake cylinder and temporarily check the flow of auxiliary reservoir air thereto; and a valve controlled by the emergency control valve and opened thereby in emergency position thereof to admit auxiliary reservoir air to the brake cylinder independently of the main triple valve portion, the flow being subject to said temporary checking action of the control valve.

8. A valve for air brakes comprising in combination a main triple valve portion which simultaneously exhausts the brake cylinder and recharges the auxiliary reservoir, and in another position admits auxiliary reservoir air to the brake cylinder; an emergency control valve arranged to respond to rapid reductions of brake pipe pressure to vent the brake pipe; and a pressure actuated valve controlled by the emergency control valve and opened thereby in emergency position of the control valve to admit auxiliary reservoir air to the brake cylinder independently of the main triple portion, said pressure actuated valve being arranged to expose an increased area to the actuating pressure as it commences its opening movement.

9. A valve for air brakes comprising in combination a main triple valve portion which simultaneously exhausts the brake cylinder and recharges the auxiliary reservoir, and in another position admits auxiliary reservoir air to the brake cylinder; an emergency control valve arranged to respond to rapid reductions of brake pipe pressure to vent the brake pipe to the brake cylinder and temporarily check the flow of auxiliary reservoir air thereto; and a pressure actuated valve controlled by the emergency control valve and opened thereby in emergency position of the control valve to admit auxiliary reservoir air to the brake cylinder independently of the main triple portion, the flow being subject to the checking action of the control valve, said pressure actuated valve being arranged to expose an increased area to the actuating pressure as it commences its opening movement.

10. A valve for air brakes comprising in combination a main triple valve portion which controls recharge of the auxiliary reservoir, exhaust of the brake cylinder, and service admission of auxiliary reservoir air to the brake cylinder; an emergency control device of the type including a piston and a connected valve, the piston being balanced between brake pipe pressure and the pressure of the confined volume of air, said device having a release position in which it effects the charging of said volume from the brake pipe, a service position to which it moves on the slow or service rate reduction of brake pipe pressure and in which it is retained during such reduction by venting of said volume at a service rate by said connected valve, and an emergency position to which it moves on a rapid reduction of brake pipe pressure; and means controlled by said emergency control device for admitting auxiliary reservoir air in emergency position to the brake cylinder independently of said triple valve.

11. A valve for air brakes comprising in combination a main triple valve portion which controls recharge of the auxiliary reservoir, exhaust of the brake cylinder, and service admission of auxiliary reservoir air to the brake cylinder; an emergency control device of the type including a piston and a connected valve, the piston being balanced between brake pipe pressure and the pressure of the confined volume of air, said device having a release position in which it effects the charging of said volume from the brake pipe, a service position to which it moves on the slow or service rate reduction of brake pipe pressure and in which it is retained during such reduction by venting of said volume at a service rate by said connected valve, and an emergency position to which it moves on a rapid reduction of brake pipe pressure; means controlled by said emergency control device for admitting auxiliary reservoir air in emergency position to the brake cylinder independently of said triple valve; and means controlled by said emergency control device in emergency position for venting the brake pipe to the brake cylinder and during such venting checking the flow of auxiliary reservoir air to the brake cylinder.

12. A valve for air brakes comprising in combination a main triple valve portion which controls recharge of the auxiliary reservoir, exhaust of the brake cylinder, and service admission of auxiliary reservoir air to the brake cylinder; an emergency control device of the type including a piston and a connected valve, the piston being balanced between brake pipe pressure and the pressure of the confined volume of air, said device having a release position in which it effects the charging of said volume from the brake pipe, a service position to which it moves on the slow or service rate reduction of brake pipe pressure and in which it is retained during such reduction by venting of said volume at a service rate by said connected valve, and an emergency position to which it moves on a rapid reduction of brake pipe pressure; means controlled by said emergency control device for admitting auxiliary reservoir air in emergency position to the brake cylinder independently of said triple valve; means controlled by said emergency control device for venting the brake pipe to the brake cylinder and during such venting flow checking the flow of auxiliary reservoir air to the brake cylinder; and means arranged to operate upon the approach of equalization between brake cylinder and auxiliary reservoir pressures to admit pressure from an additional reservoir to the brake cylinder.

13. A valve for air brakes comprising in combination a main triple valve portion which controls recharge of the auxiliary reservoir, exhaust of the brake cylinder, and service admission of auxiliary reservoir air to the brake cylinder; an emergency control device of the type including a piston and a connected valve, the piston being balanced between brake pipe pressure and the pressure of the confined volume of air, said device having a release position in which it effects the charging of said volume from the brake pipe, a service position to which it moves on the slow or service rate reduction of brake pipe pressure and in which it is retained during such reduction by venting of said volume at a service rate by said connected valve, and an emergency position to which it moves on a rapid reduction of brake pipe pressure; means controlled by said emergency control device for admitting auxiliary reservoir air in emergency position to the brake cylinder independently of said triple valve; means controlled by said emergency control device for venting the brake pipe to the brake cylinder and during such venting flow checking the flow of auxiliary reservoir air to the brake cylinder; means arranged to operate upon the approach of equalization between brake cylinder and auxiliary reservoir pressures to admit pressure from an additional reservoir to the brake cylinder; and a check valve preventing back flow from the brake cylinder to the auxiliary reservoir.

14. The combination with an emergency control mechanism of the type including a piston and a connected valve, the piston being balanced between brake pipe pressure and the pressure of a confined volume of air, the device having a release position in which it effects the charging of said volume from the brake pipe, an emergency position to which it moves on a rapid reduction of brake pipe pressure, and a service position to which it moves on a slow or service rate reduction of brake pipe pressure and in which it is retained during such reduction by venting of said volume at a service rate by said connected valve; of a valve controlling said service venting flow, subject to brake pipe pressure and arranged to terminate said flow when brake pipe pressure reaches a chosen low value.

15. The combination with an emergency control device of the type including a piston and a connected valve, the piston being balanced between brake pipe pressure and the pressure of a confined volume of air, said device having a release position in which it effects the charging of said volume from the brake pipe, an emergency position to which it moves on a rapid reduction of brake pipe pressure, and a service position to which it moves on the slow or service rate reduction of brake pipe pressure and in which it is retained during such reduction by venting of said volume at a corresponding rate by said connected valve; of a valve controlling said service venting flow subject to brake pipe pressure and arranged to terminate said flow when brake pipe pressure reaches a chosen low value; and means rendered effective by said emergency control valve in emergency position to admit pressure fluid from an emergency reservoir to said brake cylinder.

16. The combination with an emergency control device of the type including a piston and a connected valve, the piston being balanced between brake pipe pressure and the pressure of a confined volume of air, said device having a release position in which it effects the charging of said volume from the brake pipe, an emergency position to which it moves on a rapid reduction of brake pipe pressure, and a service position to which it moves on the slow or service rate reduction of brake pipe pressure and in which it is retained during such reduction by venting of said volume at a corresponding rate by said connected valve; of a valve controlling said service venting flow subject to brake pipe pressure and arranged to terminate said flow when brake pipe pressure reaches a chosen low value; and means rendered effective by said emergency control valve in emergency position to admit auxiliary reservoir air to the brake cylinder and then upon approximate equalization of auxiliary reservoir and brake cylinder pressures to admit pressure from an emergency reservoir to the brake cylinder.

17. A valve for air brakes comprising in combination, a main triple valve portion which simultaneously exhausts the brake cylinder and recharges the auxiliary reservoir, and in another position admits auxiliary reservoir air to the brake cylinder; an emergency control valve device including a piston actuated by opposed brake pipe pressure and the pressure of a volume of confined pressure fluid, and a valve actuated by said piston, the parts being so arranged that a rapid reduction of brake pipe pressure shifts the control valve to emergency position to vent the train pipe and then admit pressure fluid from an emergency reservoir to the brake cylinder, and so that a slow reduction of brake pipe pressure shifts the control valve to service position to vent the confined pressure fluid at a service rate; and a pressure actuated valve normally held open by brake pipe pressure, controlling the last named venting flow and terminating the same as brake pipe pressure reaches a chosen low valve.

18. A valve for air brakes comprising in combination a main triple valve portion which simultaneously exhausts the brake cylinder and recharges the auxiliary reservoir, and in another position admits auxiliary reservoir air to the brake cylinder; an emergency control valve device including a piston actuated by opposed brake pipe pressure and the pressure of a volume of confined pressure fluid, and a valve actuated by said piston, the parts being so arranged that a rapid reduction of brake pipe pressure shifts the control valve to emergency position to vent the train pipe and then admit pressure fluid from an emergency reservoir to the brake cylinder, and so that a slow reduction of brake pipe pressure shifts the control valve to service position to vent the confined pressure fluid at a service rate; means for directing the last named venting flow first to the brake cylinder, and then as brake pipe and auxiliary reservoir pressure approach equalization diverting it to the brake pipe; and a pressure actuated valve normally held open by brake pipe pressure, controlling the last named venting flow and terminating the same as brake pipe pressure reaches a chosen low valve.

19. A valve for air brakes comprising in combination, a main triple valve portion which simultaneously exhausts the brake cylinder and recharges the auxiliary reservoir, and in another position admits auxiliary reservoir air to the brake cylinder; an emergency control valve device including a piston balanced between brake pipe pressure and a volume of confined pressure fluid, and a valve actuated by said piston, said piston cooperating with a charging port to control charging of said volume from the brake pipe; a sealing means against which said piston may coact in charging position; and a resilient stop arranged to urge said piston to a position clear of said sealing means.

20. The combination with an emergency control mechanism of the type including a piston and a connected valve, the piston being balanced between brake pipe pressure and the pressure of a confined volume of air, the device having a release position in which it effects the charging of said volume from the brake pipe, an emergency position to which it moves on a rapid reduction of brake pipe pressure, and a service position to which it moves on a slow or service rate reduction of brake pipe pressure and in which it is retained during such reduction by venting of said volume at a service rate by said connected valve; of a valve controlling said service venting flow, subject to brake pipe pressure and arranged to terminate said flow when brake pipe pressure reaches a chosen low value; a sealing means with which said piston may coact in charging position; and a resilient stop arranged to urge said piston to a charging position clear of said sealing means.

21. The combination with a triple valve adapted to direct air from an auxiliary reservoir to a brake cylinder in emergency applications upon an emergency reduction of brake pipe pressure, of an emergency control mechanism constructed and arranged to be independently actuated by said reduction of brake pipe pressure, and when actuated serving to admit brake pipe air to the brake cylinder until a limited pressure is attained and during such admission to obstruct the flow of auxiliary reservoir air to the brake cylinder; a pressure actuated valve arranged to control an independent path from the auxiliary reservoir to the brake cylinder; and a change-over mechanism controlled by the differential of pressure between said auxiliary reservoir and brake cylinder and serving in emergency application to control said pressure actuated valve conjointly with said emergency control mechanism, and upon approach to equalization between the brake cylinder and auxiliary reservoir to shift to cause to admit air from a third source to the brake cylinder, and cause said pressure actuated valve to close.

22. The combination with a triple valve adapted to direct air from an auxiliary reservoir to a brake cylinder in emergency applications upon an emergency reduction of brake pipe pressure, of an emergency control mechanism constructed and arranged to be independently actuated by said reduction of brake pipe pressure, and when actuated serving to admit brake pipe air to the brake cylinder until a limited pressure is attained and during such admission to obstruct the flow of auxiliary reservoir air to the brake cylinder; a pressure actuated valve arranged to control an independent path from the auxiliary reservoir to the brake cylinder; a change-over mechanism controlled by the differential of pressure between said auxiliary reservoir and brake cylinder and serving in emergency application to actuate said pressure actuated valve conjointly with said emergency control mechanism, and upon approach to equalization between the brake cylinder and auxiliary reservoir to shift to cause to admit air from a third source to the brake cylinder, and cause said pressure actuated valve to close, and means rendered effective by the initial movement of said change-over mechanism to admit a small quantity of air from said third source to accelerate the movement of said change-over mechanism.

23. The combination with a triple valve adapted to direct air from an auxiliary reservoir to a brake cylinder in emergency applications upon emergency reduction of brake pipe pressure, of an emergency control mechanism constructed and arranged to be independently actuated by said reduction of brake pipe pressure and when actuated serving to admit brake pipe air to the brake cylinder until a limited pressure is attained and during such period of flow to the brake cylinder to obstruct the flow of auxiliary reservoir air through said triple valve to the brake cylinder; a change-over mechanism controlled by the differential of pressure between auxiliary reservoir brake cylinder and serving in emergency applications, upon approach to equalization to admit air from a third source to said brake cylinder; and means controlled by the initial motion of said change-over mechanism to admit a small quantity of air from said third source to act upon said change-over mechanism and accelerate its movement.

24. The combination with an emergency control valve mechanism of the type including a piston and a connected valve, the piston being balanced between brake pipe pressure and the pressure of a confined volume of air, the device having a release position in which it effects the charging of said volume from the brake pipe, an emergency position to which it moves on a rapid reduction of brake pipe pressure, and a service position to which it moves on a slow or service rate of reduction of brake pipe pressure and in which it is retained during such reduction by venting of said volume at a corresponding rate by said connected valve, of a change-over valve mechanism controlled by the differential of pressure between auxiliary reservoir and brake cylinder and serving in emergency applications upon approach to equalization to admit air from a third source to said brake cylinder, and means rendered effective by the initial change-over movement to said valve to admit air from said source to accelerate said movement.

25. The combination with an emergency control valve mechanism of the type including a piston and a connected valve, the piston being balanced between brake pipe pressure and the pressure of a confined volume of air, the device having a release position in which it effects the charging of said volume from the brake pipe, an emergency position to which it moves on a rapid reduction of brake pipe pressure, and a service position to which it moves on a slow or service rate of reduction of brake pipe pressure and in which it is retained during such reduction by venting of said volume at a corresponding rate by said connected valve; of a change-over mechanism controlled by the differential of pressure between auxiliary reservoir and brake cylinder, and rendered active by the approach to equalization in emergency to admit air from a third source to said brake cylinder and in service applications to divert said venting flow so that it passes to the brake pipe instead of the brake cylinder; and means controlled by said change-over valve in its initial change-over movement to admit pressure from said third source to accelerate such movement.

26. The combination with an emergency control valve mechanism of the type including a piston and a connected valve, the piston being balanced between brake pipe pressure and the pressure of a confined volume of air, the device having a release position in which it effects the charging of said volume from the brake pipe, an emergency position to which it moves on a rapid reduction of brake pipe pressure, and a service position to which it moves on a slow or service rate of reduction of brake pipe pressure and in which it is retained during such reduction by venting of said volume at a corresponding rate of said connected valve, of a change-over valve mechanism controlled by the differential of pressure between auxiliary reservoir and brake cylinder and rendered active by the approach to equalization in emergency to admit air from a third source to said brake cylinder and in service applications to divert said venting flow so that it passes to the brake pipe instead of the brake cylinder, means controlled by said change-over valve in its initial change-over movement to admit pressure from said third source to accelerate such movement; and a valve controlling the service venting flow to the brake pipe, subject to brake pipe pressure and arranged to terminate such flow when brake pipe pressure reaches a chosen low value.

27. The combination with an emergency control valve mechanism of the type including a piston and a connected valve, the piston being balanced between brake pipe pressure and the pressure of a confined volume of air, the device having a release position in which it effects the charging of said volume from the brake pipe, an emergency position to which it moves on a rapid reduction of brake pipe pressure, and a service position to which it moves on a slow or service rate of reduction of brake pipe pressure and in which it is retained during such reduction by venting of said volume at a corresponding rate by said connected valve; of a pressure actuated valve serving when open to admit auxiliary reservoir air to the brake cylinder; a change-over mechanism controlled by the differential of pressure between auxiliary reservoir and brake cylinder and serving in its initial position when the emergency control mechanism is in emergency position, to direct actuating pressure to said pressure actuating valve to open the same, said change-over valve serving upon the approach to equalization of pressure in emergency applications to admit air from a third source to said brake cylinder and in service application to divert said venting flow so that it passes to the brake pipe instead of to the brake cylinder.

28. The combination with an emergency control valve mechanism of the type including a piston and a connected valve, the piston being balanced between brake pipe pressure and the pressure of a confined volume of air, the device having a release position in which it effects the charging of said volume from the brake pipe, an emergency position to which it moves on a rapid reduction of brake pipe pressure, and a service position to which it moves on a slow or service rate of reduction of brake pipe pressure and in which it is retained during such reduction by venting of said volume at a corresponding rate by said connected valve; of a pressure actuated valve serving when open to admit auxiliary reservoir air to the brake cylinder; a change-over mechanism controlled by the differential of pressure between auxiliary reservoir and brake cylinder and serving in its initial position when the emergency control mechanism is in emergency position, to direct actuating pressure to said pressure actuating valve to open the same, said change-over valve serving upon the approach to equalization of pressure in emergency applications to admit air from a third source to said brake cylinder and in service application to direct said venting flow so that it passes to the brake pipe instead of to the brake cylinder; and means controlled by said change-over valve and rendered active by the initial change-over movement thereof, to admit air from said third source to accelerate said change-over movement.

In testimony whereof I have signed my name to this specification.

CHARLES A. CAMPBELL.